US007100851B2

(12) United States Patent
Hiraki et al.

(10) Patent No.: US 7,100,851 B2
(45) Date of Patent: Sep. 5, 2006

(54) METHOD AND APPARATUS FOR DISPERSING PIGMENT IN LIQUID MEDIUM

(75) Inventors: Masahiko Hiraki, Kamakura (JP); Yushi Taguchi, Hiratsuka (JP)

(73) Assignee: Kansai Paint Co., Ltd., Hyogo (JP)

(*) Notice: Subject to any disclaimer, the term of this patent is extended or adjusted under 35 U.S.C. 154(b) by 0 days.

(21) Appl. No.: 10/475,928

(22) PCT Filed: Apr. 27, 2001

(86) PCT No.: PCT/JP01/03677

§ 371 (c)(1), (2), (4) Date: Oct. 23, 2003

(87) PCT Pub. No.: WO02/089961

PCT Pub. Date: Nov. 14, 2002

(65) Prior Publication Data

US 2004/0134930 A1 Jul. 15, 2004

(51) Int. Cl.
*C08J 3/00* (2006.01)
*B02C 19/00* (2006.01)

(52) U.S. Cl. .................. 241/46.11; 241/65; 241/101.8; 241/152.2

(58) Field of Classification Search ............. 241/46.11, 241/65, 101.8, 152.2, 170–184
See application file for complete search history.

(56) References Cited

U.S. PATENT DOCUMENTS 5,593,491 A * 1/1997 Karnell ....................... 106/493
5,718,388 A * 2/1998 Czekai et al. ................. 241/21
5,723,518 A * 3/1998 Kahl et al. .................. 523/324
5,810,266 A * 9/1998 Nyssen et al. ................ 241/21
5,854,344 A * 12/1998 Shiono et al. .............. 524/862
6,020,419 A * 2/2000 Bock et al. ................. 524/590
6,050,787 A * 4/2000 Hesketh ...................... 417/412
6,582,764 B1 * 6/2003 Fuller et al. ................ 427/217
6,585,180 B1 * 7/2003 Inoue ......................... 241/171

FOREIGN PATENT DOCUMENTS

EP 0 766 997 A 4/1997
EP 0 766 997 A1 4/1997
GB 818 489 A 8/1959
JP 60-118754 6/1985
JP 2000-351916 12/2000

* cited by examiner

*Primary Examiner*—Derris H. Banks
*Assistant Examiner*—Jason Y. Pahng
(74) *Attorney, Agent, or Firm*—Knobbe Martens Olson & Bear LLP

(57) ABSTRACT

The present invention provides an apparatus for dispersing pigment in a water-based or oil-based intermediate mixture for producing a coating composition comprising a mixer and a dispersing device, the mixer having a vacuum pump and capable of conducting a primary mixing of a pigment component and resin-containing liquid medium to form an intermediate mixture, the dispersing device capable of conducting the secondary mixing of the intermediate mixture, the mixer and the dispersing device being connected by pipes to form a circulation channel for the intermediate mixture, one of the pipes being provided with a seal-less pump, the intermediate mixture capable of circulating between the mixer and the dispersing device through the circulation channel.

5 Claims, 1 Drawing Sheet

METHOD AND APPARATUS FOR DISPERSING PIGMENT IN LIQUID MEDIUM

FIELD OF THE INVENTION

The present invention relates to a method and an apparatus for dispersing pigment component in an aqueous or oily intermediate mixture in the course of producing a coating composition as a final product, and more particularly to a method and an apparatus for producing an aqueous or oily intermediate mixture wherein the pigment components are uniformly dispersed under reduced pressures.

PRIOR ART

It is known to disperse pigment particles in an aqueous medium or oily medium (sometimes referred to as "a vehicle") under a reduced pressure to obtain a pigment-containing polymer dispersion useful for producing coating compositions as final products (for example, Japanese Examined Patent Publication No. 46393/1993). Japanese Unexamined Patent Publication No. 351916/2000 proposes a pigment dispersing apparatus for continuously circulating a pigment-containing polymer dispersion between an evacuated tank and a dispersing device to achieve a high dispersing efficiency of pigment.

However, an extremely high vacuum is required in circulating the pigment-containing dispersion between the evacuated tank and the dispersing device under a controlled negative pressure. Such a high pressure necessitates the use of a large-sized vacuum pump with the increasing difficulty of precise control of the pressure. In addition, a seal pump such as gear pump and the like conventionally used for circulating the dispersion tends to suck in air through the sealing portion (axially sealed part) under highly evacuated condition to impair the efficiency of the pigment-dispersing step.

Further, the emission control over volatile organic solvents has recently been tightened. As a result, water-based coating compositions are now widely employed in various fields, replacing the oil-based compositions. However, water-based compositions have an inherent disadvantage that uniform dispersion of pigment particles therein is difficult to achieve compared with the oil-based compositions.

Generally, two types of ball mills are used for the pigment dispersion of an aqueous or oily intermediate mixture useful for producing a coating composition. A ball mill charged with steel balls is conventionally used for the pigment dispersion in oil-based mixture. Use of a steel-ball mill is, however, unavoidably accompanied by inclusion of a small amount of metal derived from the ball media to contaminate the coating composition to be finally prepared and to lower the weatherability of coated film. A pebble mill charged with ceramic pebbles is mainly used for dispersing pigments in water-based composition. However, the pebble mill is low in ability to disperse pigments in the intermediate mixture and the resultant coating composition gives a coating film having poor appearance and lacking surface gloss and evenness.

SUMMARY OF THE INVENTION

It is an object of the present invention to provide an apparatus for disintegrating or deflocculating pigment aggregates and dispersing the resulting fine pigment particles uniformly in a water-based or oil-based intermediate mixture, which enables highly effective circulation of the intermediate mixtures within the apparatus, which does not require complicated operational control and which is capable of preventing entry of air into apparatus even under a highly reduced pressure condition.

It is another object of the present invention to provide a method for dispersing pigments in a water-based or oil-based intermediate mixture, which is useful for producing a high quality coating composition with uniform pigment dispersion.

The invention provides an apparatus for dispersing pigment in a water-based or oil-based intermediate mixture for producing a coating composition, the apparatus comprising a mixer and a dispersing device, the mixer having a vacuum pump and capable of conducting a primary mixing of a pigment component and resin-containing liquid medium to form an intermediate mixture, the dispersing device being capable of conducting the secondary mixing of the intermediate mixture, the mixer and the dispersing device being connected by pipes to form a circulation channel for the intermediate mixture, one of the pipes being provided with a seal-less pump to circulate the intermediate mixture between the mixer and the dispersing device through the circulation channel.

The dispersing device is preferably a pebble mill or beads mill charged with ceramic pebbles or beads.

The seal-less pump is preferably a magnetic type seal-less pump or a canned type seal-less pump.

Preferably, the mixer is provided with a temperature regulator for controlling the temperature of the charged materials.

Preferably, the dispersing device is also provided with a temperature regulator for controlling the temperature of the intermediate mixture.

Preferably, the apparatus of the invention has a condenser between the mixer and the vacuum pump, so that the gas fraction separated by the condenser can be exhausted through the vacuum pump while the liquid fraction can be optionally returned to the mixer to adjust the solid concentration and the viscosity of the intermediate mixture.

Further, the present invention provides a method for dispersing pigments in a water-based or oil-based intermediate mixture useful for preparing a coating composition, the process comprising steps of primarily mixing a pigment component and resin-containing liquid medium to form an intermediate mixture and uniformly dispersing the pigment particles in intermediate mixture by disintegrating or deflocculating aggregated pigment to finely divided particles, the intermediate mixture being circulated between the primary mixing step and the pigment-dispersing step under reduced pressures attainable by means of a seal-less pump.

According to the process of the invention, the reduced pressure in the mixer to be attained by the vacuum pump during the primary mixing operation is preferably in the range of −0.095 to −0.010 MPa at gauge pressure. The reduced pressure in the dispersing device is preferably the same as the pressure in the mixer.

The temperature of the intermediate mixture in the apparatus is maintained usually at about 70° C. or below, preferably at about 20 to about 60° C.

The viscosity of the intermediate mixture in the apparatus is usually in the range of about 0.01 to about 100 Pa s, preferably in the range of about 0.1 to about 80 Pa s.

The concentration of solid components in the intermediate mixture during circulation is preferably maintained at a value about 5 to about 20% by weight higher than that of solid components in the intermediate mixture formed initially in the mixer. The viscosity and the concentration of solid components of the intermediate mixture in circulation can be suitably controlled by the amount of recycled liquid fraction as indicated above.

DETAILED DESCRIPTION OF INVENTION

Figure 1:
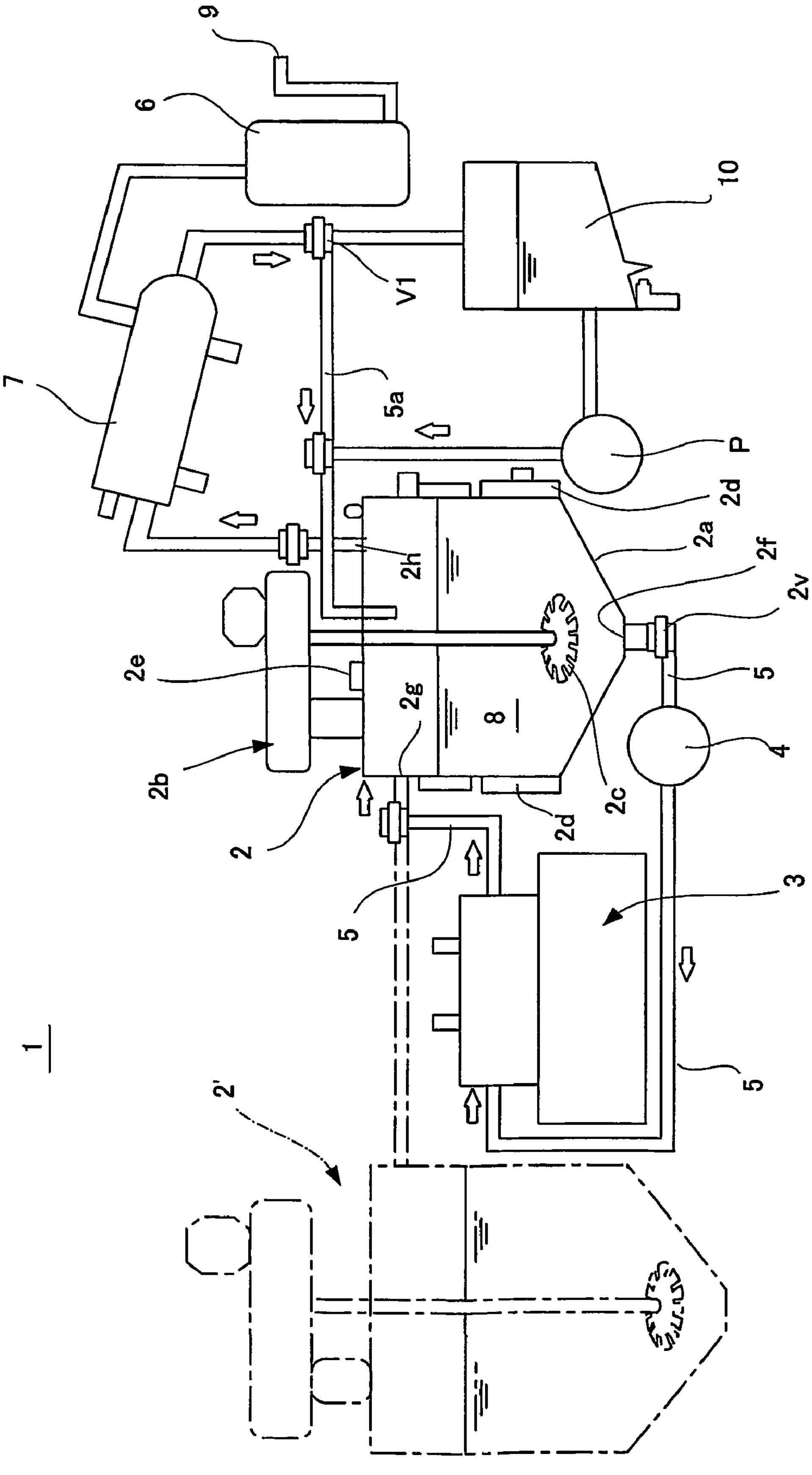
FIG. 1 shows a schematic cross section of the apparatus according to the invention.

The invention will be explained in greater detail referring to FIG. 1, which shows a preferred embodiment of the apparatus of the invention.

An apparatus for dispersion of pigment 1 is provided with a mixer 2 for primary mixing of the pigment component and the polymer-containing liquid medium to obtain the intermediate mixture and a dispersing device 3 for further mixing the intermediate mixture and disintegrating the aggregated pigment component into smaller particles. The polymer-containing liquid medium comprises known ingredients such as solvent (at least one species of water and organic solvents), pigment, polymer, dispersant and other additives. The mixer 2 and the dispersing device 3 is connected through pipes 5,5 such that the intermediate mixture produced in the mixer2 can circulate via a seal-less pump 4 between them. A vacuum pump 6 is connected thorough a condenser 7 to the upper portion of the mixer 2 to lower the pressure in the apparatus to the required level.

The mixer 2 can be any type of known mixing devices such as a high-speed impeller mill, butterfly mixer, kneader, planetary mixer, double-shaft mixer, etc. The high-speed impeller mill is preferable because it is capable of efficiently agitating and primarily mixing charged materials 8 having relatively low viscosity.

The mixer 2, in the illustrated embodiment, comprises a tank 2*a* hermetically closed in use and an impeller 2*c* attached to the rotating shaft of motor 2*b*. The mixer 2 is also provided with a temperature regulator 2*d* to which a heating medium such as steam or a coolant such as water is supplied, so as to control the temperatures of the charged materials introduced into the mixer 2 and the intermediate mixture in circulation. The tank 2*a* has an access lid 2*e* for charging the materials 8 to be mixed, an outlet port 2*f* and an inlet port 2*g* for circulation of the intermediate mixture between the mixer 2 and the dispersing device 3, and a degassing port 2*h*.

As the dispersion device 3, any type of known dispersing devices can be used such as a beads mill (also referred as "sand grinder"), continuous attrition mill, etc. The beads mill is preferable because it is lower in contamination of the mixture with iron and like metals and higher in pigment dispersion efficiency.

The seal-less pump 4 is preferably a magnetic type seal-less pump or a canned motor type seal-less pump. A diaphragm pump may also be used as a seal-less pump, though, its performance may be impaired since the diaphragm tends to deform under a reduced pressure.

A typical mode of pigment dispersion according to the invention is carried out in the following manner, using the apparatus shown in FIG. 1.

First, the access lid 2*e* of mixer 2 is opened, then materials to be primarily mixed are charged into the mixer 2. The materials for preparing water-based mixture usually include pigment, resin-containing aqueous solution or dispersion, neutralizer, etc. The materials for preparing oil-based mixture usually include pigment, resin-containing organic solution or dispersion, etc. The materials to be subjected to the primary mixing of the invention are not limited in terms of materials, ratio of materials, applications of final products, etc.

Then, with the lid 2*e* and a cross valve 2*v* located at the bottom part of the mixer 2 closed, the impeller 2*c* is rotated for premixing or primary mixing. The cross valve 2*v* can be manipulated in three directions for closing the tank 2*a*, for extracting the fully processed intermediate mixture from the bottom of the tank 2*a* and for opening to the pipe 5 to circulate the mixture. Part of the premixing step for obtaining the intermediate mixture may be carried out in a separate mixer 2', as depicted with chain lines in FIG. 1. The mixer 2 or 2' is preferably evacuated before starting the premixing step.

After completion of the premixing for producing the intermediate mixture, the cross valve 2*v* is opened to the pipe 5 and the seal-less pump 4 is activated such that the intermediate mixture is fed from the mixer 2 into the dispersing device 3 and subjected to the dispersion step. During the dispersing step in the dispersion device 3, the pigment aggregates usually present in the mixture are substantially disintegrated and dispersed in the intermediate mixture in the form of fine particles by repeated circulations between the mixer 2 and the dispersing device 3. The total time required for the circulation of a single charge to produce uniformly dispersed intermediate mixture can vary depending on various factors such as the components of materials charged for producing the intermediate mixture, the amount of charge, the performance of mixer 2 and dispersing device 3, the capacity of the whole apparatus, etc. and is usually in the range of 10 to 50 hours. A flow rate for the seal-less pump 4 can be determined in accordance with the performance and capacity of the dispersion device, etc.

During the circulation, the vacuum pump 6 is operated to reduce the pressure in the mixer 2. The reduced pressure in the mixer 2 by the vacuum pump 6 is maintained in the range of −0.095 to −0.01 MPa at gauge pressure. If the pressure is higher than −0.01 MPa at gauge pressure, air adsorbed on the pigment surface in water-based mixture, or air and water adsorbed on the pigment surface in oil-based mixture, may not be sufficiently removed, resulting in poor dispersion of pigment particles.

Evaporated components removed from the upper space of mixer 2 by the reducing pressure therein are separated into a gas fraction and a liquid fraction in the condenser 7. The gas fraction in the condenser 7 is released from an outlet port 9 via the vacuum pump 6, while the liquid fraction is sent to a storage tank 10. The liquid fraction is mainly composed of water in the case of water-based mixture and mainly composed of organic solvent in the case of oil-based mixture.

Removal of air from the pigment surface under the reduced pressure during circulation establishes better contact between pigment particles and dispersion medium, resulting in a reduction in viscosity of the intermediate mixture. However, excessively low viscosity of the mixture will cause disadvantages such as the decrease of dispersibility of pigment therein, bumping of the liquid component, abrasion of beads in the dispersion device 3, etc.

The viscosity of intermediate mixture may also change when part of the liquid component (water or water/organic solvent) is lost by evaporation under reduced pressures and elevated temperatures. When the viscosity of mixture becomes excessively high, collision between beads in the dispersion device 3 decreases and the dispersibility of pigment is lowered because air adsorbed on the surface of pigment particles cannot be removed sufficiently. In view of these advantages and disadvantages, the viscosity of intermediate mixture during circulation is controlled usually at a value between 0.01 to 100 Pa·s, preferably at a value between 0.1 to 80 Pa·s.

The apparatus according to the present invention has a structure in which the liquid fraction separated by the condenser 7 is returned to the mixer 2 during the steady mixing operation. The condenser 7 is located at a higher position than the mixer 2 and a directional control valve V1 is open to a pipe 5*a* connected to the mixer 2 during the steady operation. Before the operation attains a steady state, the directional control valve V1 is open to the storage tank 10 to drain the liquid fraction separated in the condenser 7 into the storage tank 10. In such a manner, the concentration of solid components in the intermediate mixture during circulation can be maintained at a value 5 to 20 wt % higher, preferably 7 to 15 wt % higher than the solid concentration of the initially charged materials in the mixer 2, and thus the viscosity is suitably regulated in a desired range. When the solid concentration should exceed the predetermined value and the viscosity of the mixture should increase correspondingly, a pump P could be activated to supply an additional quantity of the liquid from the storage tank 10 to the mixer 2 to control the viscosity of the circulating intermediate mixture.

The temperature of the intermediate mixture during circulation is controlled usually at a value not higher than 70° C., preferably at a value between 20 to 60° C. When the temperature is higher than 70° C., the liquid component in the mixer 2 may bump and explosively flow into the condenser 7, impairing the function of the condenser 7 or deteriorating the quality of the coating composition to be obtained as a final product.

Heating by the temperature regulator 2*d* may be required at the initial stage of mixing and dispersing steps. However, the temperature in the apparatus 1 is gradually elevated with the lapse of time to a desired level of not higher than 70° C. with the heat released by friction of ball media, rotating mechanical parts and the like. When the temperature of the mixture has reached at a predetermined level, the heating by the temperature regulator 2*d* is stopped. The temperature regulator 2*d* supplies a heating medium such as steam or a coolant such as water into a heat exchanger (not shown) helically provided on the inner surface of the tank 2*a* of the mixer 2, and controls the temperature of intermediate mixture as required.

The dispersing device 3 may additionally have a temperature regulator (not shown) for heating or cooling the intermediate mixture.

After the completion of the whole process, the intermediate mixture fully processed is extracted from the bottom of the tank 2*a* via the opened cross valve 2*v*.

The intermediate mixture processed according to the method of the invention is further subjected to succeeding steps including toning, etc. in a conventional manner to prepare a coating composition exhibiting excellent properties.

According to the invention employing a combination of a mixer and a pigment-dispersing device and capable of circulating under a reduced pressure a pigment-containing intermediate mixture therebetween, a processed mixture can be obtained with a higher efficiency and in a shorter period of time, which is highly uniform in the size distribution of finely divided pigment particles dispersed therein.

The pigment particles in the mixture processed under a reduced pressure according to the invention is substantially free of air and can adsorb the resin component effectively to form a pseudo-Newtonian fluid.

According to the invention in which a mixer and a dispersing device is connected by pipes and the intermediate mixture is circulated via a seal-less pump therebetween, suction of air is substantially prevented even under a reduced pressure with a simple operation of the seal-less pump at a fixed flow rate for a predetermined time.

According to the invention, it is possible to achieve highly uniform dispersion of pigment component in a water-based medium in contrast with the uneven dispersion of pigment component according to the prior art.

According to the invention, it is possible to prevent the degradation of the intermediate mixture and the reduction of dispersibility of pigment particles in the mixture by circulating the mixture at a mild temperature not higher than 70° C.

According to the invention, it is possible to remove a substantial amount of air or air/water from the surface of the pigment particles to improve the dispersibility of pigment particles in a water-based or oil-based intermediate mixture.

The invention claimed is:

1. An apparatus for dispersing pigment in a water-based or oil-based intermediate mixture useful for producing a coating composition, the apparatus comprising a mixer and a dispersing device, the mixer having a vacuum pump and configured to conduct a primary mixing of a pigment component and resin-containing liquid medium to form an intermediate mixture, the dispersing device configured to conduct the secondary mixing of the intermediate mixture, the mixer and the dispersing device being connected by pipes to form a circulation channel for the intermediate mixture, one of the pipes being provided with a pump to circulate the intermediate mixture between the mixer and the dispersing device through the circulation channel, wherein a condenser is provided between the mixer and the vacuum pump so as to obtain a gas fraction of the intermediate mixture and a liquid fraction of the intermediate mixture, wherein the vacuum pump is configured to exhaust the gas fraction, and wherein the mixer is connected to the condenser so as to conditionally receive the liquid fraction based at least in part on the viscosity of the intermediate mixture.

2. An apparatus according to claim 1, wherein the dispersing device is a pebble mill or beads mill.

3. An apparatus according to claim 1, wherein the seal-less pump is a magnet type seal-less pump or canned motor type seal-less pump.

4. An apparatus according to claim 1, wherein at least one of the mixer and the dispersing device is provided with a temperature regulator for controlling the temperature of the liquid in the apparatus.

5. An apparatus according to claim 1, wherein the vacuum pump is configured to maintain a pressure in the mixer in the range of about −0.095 MPa to about −0.01 MPa.

* * * * *